US 11,860,287 B2

United States Patent
Angelo et al.

(10) Patent No.: US 11,860,287 B2
(45) Date of Patent: Jan. 2, 2024

(54) SYSTEM AND METHOD FOR DETECTING OUTLIERS IN GNSS OBSERVATIONS

(71) Applicant: Swift Navigation, Inc., San Francisco, CA (US)

(72) Inventors: Joseph Angelo, San Francisco, CA (US); Christian Reimer, San Francisco, CA (US); Sébastien Carcanague, San Francisco, CA (US)

(73) Assignee: Swift Navigation, Inc., San Francisco, CA (US)

( * ) Notice: Subject to any disclaimer, the term of this patent is extended or adjusted under 35 U.S.C. 154(b) by 0 days.

(21) Appl. No.: 18/116,117

(22) Filed: Mar. 1, 2023

(65) Prior Publication Data
US 2023/0314627 A1    Oct. 5, 2023

Related U.S. Application Data

(60) Provisional application No. 63/315,426, filed on Mar. 1, 2022.

(51) Int. Cl.
*G01S 19/45* (2010.01)
*G01S 19/39* (2010.01)
(Continued)

(52) U.S. Cl.
CPC ............. *G01S 19/45* (2013.01); *G01S 19/20* (2013.01); *G01S 19/393* (2019.08); *G01S 19/43* (2013.01); *G01S 19/49* (2013.01)

(58) Field of Classification Search
CPC ........ G01S 19/45; G01S 19/393; G01S 19/43; G01S 19/48; G01S 19/49; G01S 19/20
See application file for complete search history.

(56) References Cited

U.S. PATENT DOCUMENTS 5,610,614 A    3/1997    Talbot et al.
6,317,688 B1 *  11/2001   Bruckner ............. G01C 21/005
                                                701/472
(Continued)

FOREIGN PATENT DOCUMENTS

CA    2718988 C     1/2014
CA    3079279 A1   10/2020
(Continued)

OTHER PUBLICATIONS

Phelts, R. Eric, et al., "Innovation: Improving ARAIM, An approach using precise point positioning", GPS World, Jun. 13, 2020, https://www.gpsworld.com/innovation-improving-araim/.
(Continued)

*Primary Examiner* — Cassi J Galt
(74) *Attorney, Agent, or Firm* — Jeffrey Schox; Randy Mehlenbacher

(57) ABSTRACT

An system and/or method for detecting outliers in satellite observations can include: receiving satellite observations associated with one or more satellite constellations; receiving sensor data; determining a GNSS positioning solution using a filter to process the satellite observations; determining a fused positioning solution; detecting whether outliers are present in the satellite observations; and when outliers are detected, updating the GNSS positioning solution and/or the fused positioning solution using a set of outlier mitigated satellite observations.

18 Claims, 6 Drawing Sheets

(51) Int. Cl.
  *G01S 19/43*  (2010.01)
  *G01S 19/20*  (2010.01)
  *G01S 19/49*  (2010.01)

(56) References Cited

U.S. PATENT DOCUMENTS

| | | |
|---|---|---|
| 6,427,122 B1 | 7/2002 | Lin |
| 6,453,237 B1 | 9/2002 | Fuchs et al. |
| 6,552,680 B1 | 4/2003 | Barber et al. |
| 6,647,340 B1 | 11/2003 | Pemble et al. |
| 6,691,066 B1 | 2/2004 | Brodie |
| 6,816,117 B2 | 11/2004 | Fink et al. |
| 6,856,905 B2 | 2/2005 | Pasturel et al. |
| 6,864,836 B1 | 3/2005 | Hatch et al. |
| 7,026,982 B2 | 4/2006 | Toda et al. |
| 7,219,013 B1 | 5/2007 | Young et al. |
| 7,289,061 B2 | 10/2007 | Komjathy et al. |
| 7,292,183 B2 | 11/2007 | Bird et al. |
| 7,298,325 B2 | 11/2007 | Krikorian et al. |
| 7,382,313 B1 | 6/2008 | Goad |
| 7,409,289 B2 | 8/2008 | Coatantiec et al. |
| 7,538,721 B2 | 5/2009 | Vollath et al. |
| 7,692,578 B2 | 4/2010 | Vollath et al. |
| 7,696,922 B2 | 4/2010 | Nicholson et al. |
| 8,089,402 B2 | 1/2012 | Maenpa et al. |
| 8,094,065 B2 | 1/2012 | Henkel |
| 8,193,976 B2 | 6/2012 | Shen et al. |
| 8,255,155 B1 | 8/2012 | Crane et al. |
| 8,416,133 B2 | 4/2013 | Hatch et al. |
| 8,447,517 B2 | 5/2013 | Roh |
| 8,542,146 B2 | 9/2013 | Vollath |
| 8,587,475 B2 | 11/2013 | Leandro |
| 8,610,624 B2 | 12/2013 | Savoy |
| 8,756,001 B2 | 6/2014 | Georgy et al. |
| 8,760,343 B2 | 6/2014 | Milyutin et al. |
| 8,825,456 B2 | 9/2014 | Vasudevan et al. |
| 8,860,609 B2 | 10/2014 | Roh |
| 8,996,311 B1 | 3/2015 | Morin et al. |
| 9,031,782 B1 | 5/2015 | Lemay et al. |
| 9,069,073 B2 | 6/2015 | Ramakrishnan et al. |
| 9,128,176 B2 | 9/2015 | Seeger |
| 9,182,497 B2 | 11/2015 | Geier et al. |
| 9,405,012 B2 | 8/2016 | Doucet et al. |
| 9,405,016 B2 | 8/2016 | Yim |
| 9,417,330 B2 | 8/2016 | Revol et al. |
| 9,488,734 B2 * | 11/2016 | Davain ............... G01S 19/393 |
| 9,557,422 B1 | 1/2017 | Miller et al. |
| 9,568,321 B2 | 2/2017 | Bharadwaj et al. |
| 9,602,974 B2 | 3/2017 | Rudow et al. |
| 9,612,341 B2 | 4/2017 | Large et al. |
| 9,709,683 B2 | 7/2017 | Leandro et al. |
| 9,784,844 B2 | 10/2017 | Kana et al. |
| 9,857,474 B2 | 1/2018 | Tan et al. |
| 9,927,530 B2 | 3/2018 | Boyarski |
| 10,018,729 B2 | 7/2018 | Dunik et al. |
| 10,101,464 B2 | 10/2018 | Appleford et al. |
| 10,260,888 B2 | 4/2019 | Takahashi |
| 10,267,924 B2 | 4/2019 | Ramanandan et al. |
| 10,274,606 B1 | 4/2019 | Phan et al. |
| 10,422,885 B2 | 9/2019 | Dai et al. |
| 10,459,593 B2 | 10/2019 | Tiwari et al. |
| 10,578,747 B2 | 3/2020 | Grgich et al. |
| 10,677,933 B1 | 6/2020 | Gavrilets et al. |
| 10,802,160 B2 | 10/2020 | Dai et al. |
| 10,809,388 B1 | 10/2020 | Carcanague et al. |
| 10,901,096 B2 | 1/2021 | Thrasher et al. |
| 11,156,718 B2 | 10/2021 | Takeda |
| 11,187,813 B2 | 11/2021 | Brandl et al. |
| 11,259,141 B2 | 2/2022 | Li et al. |
| 11,327,182 B2 | 5/2022 | Zalewski et al. |
| 11,422,269 B2 | 8/2022 | Ookubo et al. |
| 11,422,271 B2 | 8/2022 | Talbot et al. |
| 11,550,067 B2 | 1/2023 | Reimer et al. |
| 2002/0180641 A1 | 12/2002 | Fink et al. |
| 2003/0085840 A1 | 5/2003 | Benner et al. |
| 2005/0001762 A1 | 1/2005 | Han et al. |
| 2005/0001763 A1 | 1/2005 | Han et al. |
| 2005/0024263 A1 | 2/2005 | Sharpe et al. |
| 2005/0114023 A1 | 5/2005 | Williamson et al. |
| 2007/0126629 A1 | 6/2007 | Krikorian et al. |
| 2008/0205521 A1 | 8/2008 | Van |
| 2009/0018772 A1 | 1/2009 | Watanabe et al. |
| 2009/0184869 A1 | 7/2009 | Talbot et al. |
| 2009/0273511 A1 | 11/2009 | Schroth |
| 2010/0033370 A1 | 2/2010 | Lopez et al. |
| 2010/0164789 A1 | 7/2010 | Basnayake |
| 2010/0283675 A1 | 11/2010 | McAree et al. |
| 2010/0324822 A1 | 12/2010 | Coatantiec et al. |
| 2011/0050497 A1 | 3/2011 | Maenpa et al. |
| 2011/0090116 A1 | 4/2011 | Hatch et al. |
| 2011/0122022 A1 | 5/2011 | Van et al. |
| 2011/0140959 A1 | 6/2011 | Vollath |
| 2011/0148698 A1 | 6/2011 | Vollath |
| 2011/0187589 A1 | 8/2011 | Gaal et al. |
| 2011/0187590 A1 | 8/2011 | Leandro |
| 2011/0316740 A1 | 12/2011 | Waters et al. |
| 2012/0154210 A1 | 6/2012 | Landau et al. |
| 2012/0173195 A1 | 7/2012 | Opshaug et al. |
| 2012/0176271 A1 | 7/2012 | Dai et al. |
| 2013/0050020 A1 | 2/2013 | Peck et al. |
| 2013/0099970 A1 | 4/2013 | Lin et al. |
| 2013/0227377 A1 | 8/2013 | Rao et al. |
| 2013/0234885 A1 | 9/2013 | Geier et al. |
| 2013/0265191 A1 | 10/2013 | Ghinamo |
| 2013/0271318 A1 | 10/2013 | Landau et al. |
| 2013/0335264 A1 | 12/2013 | Revol et al. |
| 2014/0015712 A1 | 1/2014 | Leandro et al. |
| 2014/0062765 A1 | 3/2014 | Brenner |
| 2014/0184442 A1 | 7/2014 | Large et al. |
| 2014/0232592 A1 | 8/2014 | Psiaki et al. |
| 2014/0240172 A1 | 8/2014 | Milyutin et al. |
| 2014/0266876 A1 | 9/2014 | Tan et al. |
| 2014/0288825 A1 | 9/2014 | Czompo et al. |
| 2014/0375495 A1 | 12/2014 | Fleming et al. |
| 2015/0019464 A1 | 1/2015 | Nguyen-Tuong et al. |
| 2015/0173037 A1 | 6/2015 | Pijl |
| 2015/0260848 A1 | 9/2015 | Mundt et al. |
| 2015/0270615 A1 | 9/2015 | Neenan |
| 2015/0293230 A1 | 10/2015 | Weed et al. |
| 2015/0293233 A1 | 10/2015 | De Jong |
| 2015/0369924 A1 | 12/2015 | Hedgecock et al. |
| 2016/0011318 A1 | 1/2016 | Cohen |
| 2016/0097859 A1 | 4/2016 | Hansen et al. |
| 2016/0195617 A1 | 7/2016 | Phatak et al. |
| 2017/0269216 A1 | 9/2017 | Dai et al. |
| 2017/0269222 A1 | 9/2017 | Dai et al. |
| 2017/0269231 A1 | 9/2017 | Dai et al. |
| 2017/0299730 A1 | 10/2017 | Lie et al. |
| 2017/0299731 A1 | 10/2017 | Lie et al. |
| 2017/0322313 A1 | 11/2017 | Revol et al. |
| 2018/0113219 A1 | 4/2018 | Wuebbena |
| 2018/0120445 A1 | 5/2018 | Dill |
| 2018/0164442 A1 | 6/2018 | Thrasher et al. |
| 2018/0172838 A1 | 6/2018 | Junker et al. |
| 2018/0188032 A1 | 7/2018 | Ramanandan et al. |
| 2018/0246217 A1 | 8/2018 | Wuebbena |
| 2018/0252818 A1 | 9/2018 | Sato et al. |
| 2018/0283882 A1 | 10/2018 | He et al. |
| 2018/0299562 A1 | 10/2018 | Green |
| 2018/0306930 A1 | 10/2018 | Laine et al. |
| 2019/0004180 A1 | 1/2019 | Jokinen |
| 2019/0078895 A1 | 3/2019 | Ma et al. |
| 2019/0154837 A1 | 5/2019 | Noble et al. |
| 2019/0187295 A1 | 6/2019 | Lee et al. |
| 2019/0187298 A1 | 6/2019 | Grgich et al. |
| 2019/0204450 A1 | 7/2019 | Revol |
| 2019/0243001 A1 | 8/2019 | Ookubo et al. |
| 2019/0302274 A1 | 10/2019 | Berntorp et al. |
| 2019/0339396 A1 | 11/2019 | Turunen |
| 2020/0025936 A1 | 1/2020 | Zhou et al. |
| 2020/0025937 A1 | 1/2020 | Kroeger et al. |
| 2020/0041654 A1 | 2/2020 | Noble et al. |
| 2020/0096649 A1 | 3/2020 | Brandl et al. |
| 2020/0209406 A1 | 7/2020 | Lin et al. |

(56) References Cited

U.S. PATENT DOCUMENTS

| | | |
|---|---|---|
| 2020/0233056 A1 | 7/2020 | Dolgov et al. |
| 2020/0257002 A1 | 8/2020 | Henkel |
| 2020/0348422 A1 | 11/2020 | Carcanague et al. |
| 2021/0026374 A1 | 1/2021 | Burghardt et al. |
| 2021/0033735 A1 | 2/2021 | Kleeman |
| 2021/0116579 A1 | 4/2021 | Rezaei |
| 2021/0165104 A1 | 6/2021 | Zalewski et al. |
| 2021/0165111 A1 | 6/2021 | Zalewski |
| 2021/0215831 A1 | 7/2021 | Takeda |
| 2021/0255336 A1 | 8/2021 | Noble et al. |
| 2021/0405213 A1 | 12/2021 | Tuck et al. |
| 2022/0058322 A1 | 2/2022 | Brandl et al. |
| 2022/0163677 A1 | 5/2022 | Muthuraman et al. |
| 2022/0171053 A1 | 6/2022 | Park et al. |
| 2022/0397684 A1 | 12/2022 | Kee et al. |

FOREIGN PATENT DOCUMENTS

| | | | |
|---|---|---|---|
| CN | 101166995 A | 4/2008 | |
| CN | 103197327 A | 7/2013 | |
| CN | 103760573 A | 4/2014 | |
| CN | 104236522 A | 12/2014 | |
| CN | 104732085 A | 6/2015 | |
| CN | 106970404 A | 7/2017 | |
| CN | 105629263 B | 4/2019 | |
| CN | 107422354 B | 6/2019 | |
| CN | 110727002 A | 1/2020 | |
| CN | 111272174 A | 3/2020 | |
| CN | 109714421 B | 8/2021 | |
| CN | 114174850 A | 3/2022 | |
| EP | 0244091 A2 | 11/1987 | |
| EP | 1729145 A1 | 12/2006 | |
| EP | 2128841 A1 | 12/2009 | |
| EP | 2602752 A1 | 6/2013 | |
| EP | 1839070 B2 | 4/2014 | |
| EP | 2966477 A1 | 1/2016 | |
| EP | 3627188 A1 | 3/2020 | |
| EP | 3566021 B1 | 3/2021 | |
| EP | 3865915 A1 | 8/2021 | |
| KR | 101181990 B1 | 9/2012 | |
| WO | 2017046914 A1 | 3/2017 | |
| WO | 2017070732 A1 | 5/2017 | |
| WO | WO-2020214680 A1 * | 10/2020 | G01S 5/009 |
| WO | 2020240307 A1 | 12/2020 | |

OTHER PUBLICATIONS

Pullen, Sam , "Augmented GNSS: Fundamentals and Keys to Integrity and Continuity", Department of Aeronautics and Astronautics, Stanford University, Stanford, CA 94305-4035 USA, Tuesday, Sep. 20, 2011 1:30-5:00 PM Oregon Convention Center, Portland, Oregon.

Rasmussen, C.E. , et al., "Gaussian Processes for Machine Learning", MIT Press, 2006, ISBN 026218253X. c 2006 Massachusetts Institute of Technology, (Year: 2006).

Rodriguez-Solano, Carlos , et al., "Protection Level of the Trimble RTX Positioning Engine for Autonomous Applications", Proceedings of the 34th International Technical Meeting of the Satellite Division of The Institute of Navigation (ION GNSS+ 2021), Sep. 20-24, 2021.

Rothacher, M. , et al., "ANTEX: The Antenna Exchange Format, Version 1.4", Sep. 15, 2010, IGC International GNSS Service, https://kb.igs.org/hc/en-us/articles/216104678-ANTEX-format-description.

Roysdon, Paul F., et al., "GPS-INS Outlier Detection & Elimination using a Sliding Window Filter", 2017 American Control Conference (ACC), May 24-26, 2017, Seattle, WA, USA.

Satirapod, Chalermehon , "Improving the GPS Data Processing Algorithm for Precise Static Relative Positioning", School of Surveying and Spatial Information Systems The University of New South Wales. Jan. 2002.

Schmid, R. , et al., "Estimation of elevation-dependent satellite antenna phase center variations of GPS satellites", Journal of Geodesy (2003) 77: 440-446, May 19, 2003, DOI 10.1007/s00190-003-0339-0.

Schmid, Ralf , et al., "From Relative Absolute Antenna Phase Center Corrections", Conference: IGS Workshop and Symposium 2004.

Schmid, Ralf , "How to Use IGS Antenna Phase Center Corrections", GPS World Tech Talk, Feb. 3, 2010.

Schmitz, Martin , "RTCM State Space Representation Messages, Status and Plans", PPP-RTK & Open Standards Symposium, Mar. 12-13, 2012, Frankfurt, Germany.

Shapiro, Larry S., et al., "Rejecting Outliers and Estimating Errors in an Orthogonal-Regression Framework", Phil. Trans. R. Soc. Load. A (1995)350, 407-439. (Year:1995).

Skog, Isaac , et al., "A Low-Cost GPS Aided Inertial Navigation System for Vehicle Applications", 2005 13th European Signal Processing Conference, 4-8 Sep. 2005.

Snelson, Edward , et al., "Sparse Gaussian Process using Pseudo-inputs", NIPS'05: Proceedings of the 18th International Conference on Neural Information Processing Systems, Dec. 2005, pp. 1257-1264.

Subirana, J. Sanz, et al., "Carrier Phase Cycle-Slip Detection—Navipedia", https://gssc.esa.int/navipedia/index.php/Carrier_Phase_Cycle-Slip_Detection, published 2011.

Takasu, Tomoji , et al., "ION GNSS 2008 abstract submission Cycle slip detection and fixing by MEMS IMU/GPS integration for mobile environment RTK-GPS", Tokyo University of Marine Science and Technology, ION GNSS 2008, abstract submission.

Teunissen, P.J.G. , "GNSS Integer Ambiguity Validation: Overview of Theory and Methods", Proceedings of the ION 2013 Pacific PNT Meeting, Apr. 23-25, 2013, Marriott Waikiki Beach Resort & Spa, Honolulu, Hawaii, https://www.on.org/publications/abstract.cfm?articleID=11030.

Teunissen, Peter J.G., et al., "Integer Aperture Estimation A Framework for GNSS Ambiguity Acceptance Testing", InsideGNSS, Mar./Apr. 2011, pp. 66-73, www.insidegnss.com.

Teunissen, P.J.G. , "On the GPS widelane and its decorrelating property", Delft Geodetic Computing Centre, Journal of Geodesy (1997) 71: 577-587.

Thombre, Sarang , et al., "GNSS Threat Monitoring and Reporting: Past, Present, and a Proposed Future", The Journal of Navigation, Dec. 2017, DOI: 10.1017/S0373463317000911, https://www.researchgate.net/publication/321663256.

Titsias, Michael K., "Variational Learning of Inducing Variables in Sparse Gaussian Processes", http://proceedings.mlr.press/v5/titsias09a/titsias09a.pdf, 2009.

Urquhart, Landon , "An Analysis of Multi-Frequency Carrier Phase Linear Combinations for GNSS", Department of Geodesy and Geomatics Engineering, University of New Brunswick, Technical Report No. 263, Feb. 2009.

Urquhart, Landon , et al., "Innovation: Integrity for safe navigation", https://www.gpsworld.com/innovation-integrity-for-safe-navigation-provided-by-gnss-service/, GPS World, Feb. 12, 2020.

Van Diggelen, Frank , et al., "Google to improve urban GPS accuracy for apps", Dec. 9, 2020, Android Developers Blog.

Van Graas, Frank , et al., "Precise Velocity Estimation Using a Stand-Alone GPS Receiver", Abstract only, Journal of The Institute of Navigation, vol. 51, No. 4, Winter 2004-2005, pp. 283-292, https://www.ion.org/publications/abstract.cfm?articleID=102384.

Verhagen, S. , "The GNSS integer ambiguities: Estimation and validation", Aerospace Engineering, Jan. 31, 2005.

Waserman, Eyal , et al., "A Mixed Integer Least-Squares Formulation of the GNSS Snapshot Positioning Problem", https://github.com/eyalw711/snapshot-positioning, Jun. 2, 2021.

Wendel, J. , et al., "Time-Differenced Carrier Phase Measurements for Tightly Coupled GPS/INS Integration", 0-7803-9454-2/06/$20.00/© 2006 IEE, Jul. 5, 2006, 2006 IEEE/ION Position, Location, and Navigation Symposium, Date of Conference: Apr. 25-27, 2006.

Wubbena, Gerhard , et al., "PPP-RTK: Precise Point Positioning Using State-Space Representation in RTK Networks", Presented at the 18th International Technical Meeting, ION GNSS-05, Sep. 13-16, 2005, Long Beach, California.

(56) References Cited

OTHER PUBLICATIONS

Yang, Wenhao, et al., "An Improved Relative GNSS Tracking Method Utilizing Single Frequency Receivers", Sensors 2020, 20, 4073; doi:10.3390/s20154073 www.mdpi.com/journal/sensors, 19 pages.
Zair, Salim, et al., "Outlier Detection in GNSS Pseudo-Range/Doppler Measurements for Robust Localization", Sensors 2016, 16, 580; doi:10.3390/s16040580, www.mdpi.com/journal/sensors.
Zhu, Ni, et al., "GNSS Position Integrity in Urban Environments: A Review of Literature", IEEE Transactions on Intelligent Transportation Systems, 2018, 17p., 10.1109/TITS.2017.2766768.hal-01709519.
Tanedo, Flip, "Notes on non-holonomic constraints", For P3318, Spring 2013, https://www.physics.uci.edu/~tanedo/files/teaching/P3318S13/Sec_05_nonholonomic.pdf.
Won, Dachee, et al., "Performance Improvement of Inertial Navigation System by Using Magnetometer with Vehicle Dynamic Constraints", Hindawi, vol. 2015 | Article ID 435062 | https://doi.org/10.1155/2015/435062, https://www.hindawi.com/journals/js/2015/435062/.
"Navstar GPS Space Segment/Navigation User Segment Interfaces", IS-GPS-200L, 228 pages (Year: 2020), May 14, 2020.
"Wikipedia (Covariance matrix)", https://en.wikipedia.org/wiki/Covariance_matrix, downloaded May 2, 2023 (Year: 2023).
Geng, Jianghui, et al., "Toward global instantaneous decimeter-level positioning using tightly coupled multi-constellation andmulti-frequency GNSS", Journal of Geodesy, vol. 92, p. 977-991 (Year: 2019).
Maybeck, Peter S., "Stochastic models, estimation, and control", vol. 1, Academic Press, p. 1-16, 133-134, 169-176, 203-220, 275-276, 289-306, 341-362, 411-423 (Year: 1979).
Ogaja, Clement A., "Applied GPS for Engineers and Project Managers", ASCE Press, p. 177-179 (Year: 2011).
Pongsakornsathien, Nichakorn, et al., "A Performance-Based Airspace Model for Unmanned Aircraft Systems Traffic Management", Aerospace, vol. 7(154), 26 pages (Year: 2020).
"An Introduction to GNSS, Chapter 4, GNSS Error Sources", https://novatel.com/an-introduction-to-gnss/chapter-4-gnsserror-sources, published 2015.
"Geo++ SSR For Network-RTK, PPP and PPP-RTK", https://geopp.de/wp-content/uploads/2020/09/SSR_Flyer_v3.pdf, Sep. 2015.
"IGS State Space Representation (SSR) Format Version 1.00", International GNSS Service (IGS), Oct. 5, 2020.
"Integrity-Navipedia", https://gssc.esa.int/navipedia/index.php/Integrity, published 2011.
"Phase II of the GNSS Evolutionary Architecture Study", https://www.faa.gov/about/office_org/headquarters_offices/ato/service_units/techops/navservices/gnss/library/documents/media/geasphaseii_final.pdf, Feb. 2010.
"Raim", GMV, 2011, RAIM.
"Safe Position Augmentation for Real-Time Navigation (SPARTN) Interface Control Document Version 1.8.0", Jan. 2020, Sapcorda Services GmbH.
"Swift Navigation Binary Protocol", Version 3.4.5, Mar. 10, 2021, pp. 1-156.
Altmayer, Christian, "Cycle Slip Detection and Correction by Means of Integrated Systems", ION Institute of Navigation, Proceedings of the 200 National Technical Meeting of the Institute of Navigation, Abstract, Jan. 26-28, 2000.
Berntorp, Karl, et al., "Bayesian Sensor Fusion of GNSS and Camera With Outlier Adaptation for Vehicle Positioning", Mitsubishi Electric Research Laboratories, https://www.merl.com, Aug. 6, 2022.
Blanch, Juan, et al., "RAIM with Optimal Integrity and Continuity Allocations Under Multiple Failures", IEEE Transactions on Aerospace and Electronic Systems, vol. 46, No. 3, Jul. 2010.
Boda, Aaron, "Cycle Slip Detection using PVA Kalman Filter", Technical Report—Dec. 2017.
Brack, A., "Optimal Estimation of a Subset of Integers With Application To Gnss", Artificial Satellites, vol. 51, No. 4—2016 DOI: 10.1515/arsa-2016-0011.
Brocard, Philippe, "Integrity monitoring for mobile users in urban environment", https://tel.archives-ouvertes.fr/tel-01379632/document, submitted Oct. 11, 2016.
Bruno, Jon, et al., "A realistic simulation framework to evaluate ionospheric tomography", Advances in Space Research 65 (2020) 891-901.
Cassel, Ryan, "Real-Time ARAIM Using GPS, GLONASS, and GALILEO", Submitted in partial fulfillment of the requirements for the degree of Master of Science in Mechanical and Aerospace Engineering in the Graduate College of the Illinois Institute of Technology, May 2017.
Chiu, David S., et al., "Bierman-Thorton UD Filtering for Double-Differenced Carrier Phase Estimation Accounting for Full Mathematical Correlation", Jan. 2008, ION NTM 2008, pp. 756-762., 2017-06-23 00:00:00.0.
Davidson, Pavel, et al., "Improved Vehicle Positioning in Urban Environment through Integration of GPS and Low-Cost Inertial Sensors", European Navigation Conference, ENC-GNSSAt: Naples, Italy, May 2009.
Ding, Wei, et al., "Carrier Phase-Based Precise Heading and Pitch Estimation Using a Low-Cost GNSS Receiver", Remote Sens. 2021, 13,3642. https://doi.org/10.3390/rs13183642.
Drescher, Ralf, "Fast convergence of Trimble CenterPoint RTX by regional augmentation", Trimble Terrasat GmbJ, Munich, EGU General Assembly 2015, Vienna, Thursday, Apr. 16, 2015.
Farrell, James L., "Carrier Phase Processing Without Integers", Ion 57th Annual Meeting/CIGTF 20th Biennial Guidance Test Symposium, Jun. 11-13, 2001, Albuquerque, NM.
Favey, Etienne, et al., "Dead reckoning fills-in GPS navigation gap", EE Times, Automotive Designline, Aug. 18, 2011.
Feng, Shaun, et al., "Carrier phase-based integrity monitoring for high-accuracy positioning", GPS Solution, Apr. 2009.
Freda, Peirluigi, et al., "Time-differenced carrier phases technique for precise GNSS velocity estimation", GPS Solut, DOI 10.1007/s10291-014-0425-1, published online Dec. 31, 2014.
Gratton, Livio, et al., "Carrier Phase Relative RAIM Algorithms and Protection Level Derivation", Journal of Navigation (2010), 63, 215-231, doi: 10.1017/S0373463309990403.
Gunning, Kazuma, et al., "Design and evaluation of integrity algorithms for PPP in kinematic applications", Proceedings of the 31st International Technical Meeting of the Satellite Division of The Institute of Navigation (ION GNSS+ 2018) Sep. 24-28, 2018, Hyatt Regency Miami, Miami, Florida.
Henkel, Patrick, et al., "Joint L-/C-Band Code and Carrier Phase Linear Combinations for Galileo", International Journal of Navigation and Observation, vol. 2008, Article ID 651437, 8 pages.
Hirokawa, Dr. Rui, "Recent Activity of International Standardization for High-Accuracy GNSS Correction Service", Mitsubishi Electric, Jun. 27, 2019.
Juang, Panpan, "Airborne GNSS PPP Based Pseudolite System", School of Civil and Environmental Engineering Faculty of Engineering UNSW. Jun. 2019.
Karaim, Malek, et al., "GNSS Error Sources", https://www.intechopen.com/books/multifunctional-operation-and-application-of-gps/gnss-error-sources, published Apr. 6, 2018.
Karaim, Malek, et al., "GPS Cycle Slip Detection and Correction at Measurement Level", British Journal of Applied Science & Technology 4(29): 4239-4251, 2014.
Khanafseh, Samer, et al., "GNSS Multipath Error Modeling for Automotive Applications", Abstract only, Proceedings of the 31st International Technical Meeting of the Satellite Division of The Institute of Navigation (ION GNSS+ 2018), Miami, Florida, Sep. 2018, pp. 1573-1589, https://www.ion.org/publications/abstract.cfm?articleID=16107.
Kilic, Cagri, et al., "ZUPT Aided GNSS Factor Graph with Inertial Navigation Integration for Wheeled Robots", Proceedings of the 34th International Technical Meeting of the Satellite Division of The Institute of Navigation (ION GNSS+ 2021) Sep. 20-24, 2021.
Kim, Jungbeom, et al., "A Low-Cost High-Precision Vehicle Navigation System for Urban Environment Using Time Differenced Carrier Phase Measurements", Proceedings of the 2020 International Technical Meeting, 597 ION ITM 2020, San Diego, California, Jan. 21-24, 2020, https://doi.org/10.33012/2020.17164.

(56) References Cited

OTHER PUBLICATIONS

Kissai, Ali, et al., "UAV Dead Reckoning with and without using INS/ GPS Integrated System in GPS denied Polar Region", International Journal of Aeronautics and Aerospace Engineering, ISSN: 2643-8224, 10 pages, published Aug. 26, 2019.
Ko, Jonathan, et al., "GP-UKF: Unscented kalman filters with Gaussian process prediction and observation models", Conference Paper, Dec. 2007, 10.1109/IROS.2007.4399284.
Kuusniemi, Heidi, et al., "GNSS Signal Reliability Testing in Urban and Indoor Environments", Proceedings of NTM 2004 Conference (Session A2), San Diego, CA, Jan. 26-28, 2004, The Institute of Navigation.
Lee, Jae Ho, et al., "A Two-antenna GPS Receiver Integrated with Dead Reckoning Sensors", ION Institute of Navigation, Proceedings of the IAIN Work Congress and the 56th Annual Meeting of the Institute of Navigation, Jun. 26-28, 2000, 4 pages.
Lei, Yu, et al., "Prediction of Navigation Satellite Clock Bias by Gaussian Process Regression", Lecture Notes in Electrical Engineering 342:411-423, Jan. 2015.
Li, T., et al., "Some remarks on GNSS integer ambiguity validation methods", Survey Review, Dec. 5, 2012, vol. 44, No. 326.
Lim, Cheol-Soon, et al., "Feasibility Study on Integration of SSR Correction into Network RTK to Provide More Robust Service", JPNT 7(4), 295-305 (2018).
Lin, Ming, et al., "Robust Gaussian Process Regression for Real-Time High Precision GPS Signal Enhancement", www.gps.gov/systems/gps/performance/accuracy, Jun. 5, 2019.
Liu, Haiying, et al., "A closed-loop EKF and multi-failure diagnosis approach for cooperative GNSS positioning", Engineering, GPS Solutions, Published 2015.
Madani, Kurosh, et al., "Studies in Computational Intelligence", Revised and Selected Papers of the International Joint Conference, IJCCI 2011, Paris, France, Oct. 24-26, 2011.
Madrid, Navarro, et al., "New Approach for Integrity Bounds Computation Applied to Advanced Precise Positioning Applications", Proceedings of the 28th International Technical Meeting of the Satellite Division of The Institute of Navigation (ION GNSS+ 2015) Sep. 14-18, 2015, Tampa Convention Center, Tampa, Florida.
Meng, Xiaoli, et al., "A Robust Vehicle Localization Approach Based on GNSS/IMU/DMI/LiDAR Sensor Fusion for Autonomous Vehicles", Sensors, 2017, 17, 2140.
Odijk, Dennis, et al., "On the estimability of parameters in undifferenced, uncombined GNSS network and PPP-RTK user models by means of S-system theory", Journal of Geodesy, Nov. 2015.
Peng, Hao, et al., "Covariance Fusion Strategy of Gaussian Processes Covariance and Orbital Prediction Uncertainty", Conference: AAS/AIAA Astrodynamics Specialist Conference, Portland, ME, Aug. 2019.
Pervan, Boris, et al., "Shaping Aviation Integrity Two RAIMs for Safety", GPS World The Business and Technology of Global Navigation and Positioning, Apr. 1, 2008.
Petovello, Mark, "How does a GNSS receiver estimate velocity?", Inside GNSS, Mar./Apr. 2015, www.insidegnss.com.
Reimer, Christian, et al., "System and Method for Fusing Sensor and Satellite Measurements for Positioning Determination", U.S. Appl. No. 18/115,963, filed Mar. 1, 2023.
Emter, Thomas, et al., "Stochastic Cloning for Robust Fusion of Multiple Relative and Absolute Measurements", 2019 EIE Intelligent Vehicles Symposium (IV) Paris, France. Jun. 9-12, 2019.
Roumeliotis, Stergios I., et al., "Stochastic Cloning: A generalized framework for processing relative state measurements", Proceedings of the 2002 IEEE International Conference on Robotics & Automation, Washington, DC, May 2002.

* cited by examiner

SYSTEM AND METHOD FOR DETECTING OUTLIERS IN GNSS OBSERVATIONS

CROSS-REFERENCE TO RELATED APPLICATIONS

This application claims the benefit of U.S. Provisional Application No. 63/315,426, filed 1 Mar. 2022, which is incorporated in its entirety by this reference.

TECHNICAL FIELD

This invention relates generally to the satellite positioning field, and more specifically to a new and useful system and method in the satellite positioning field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
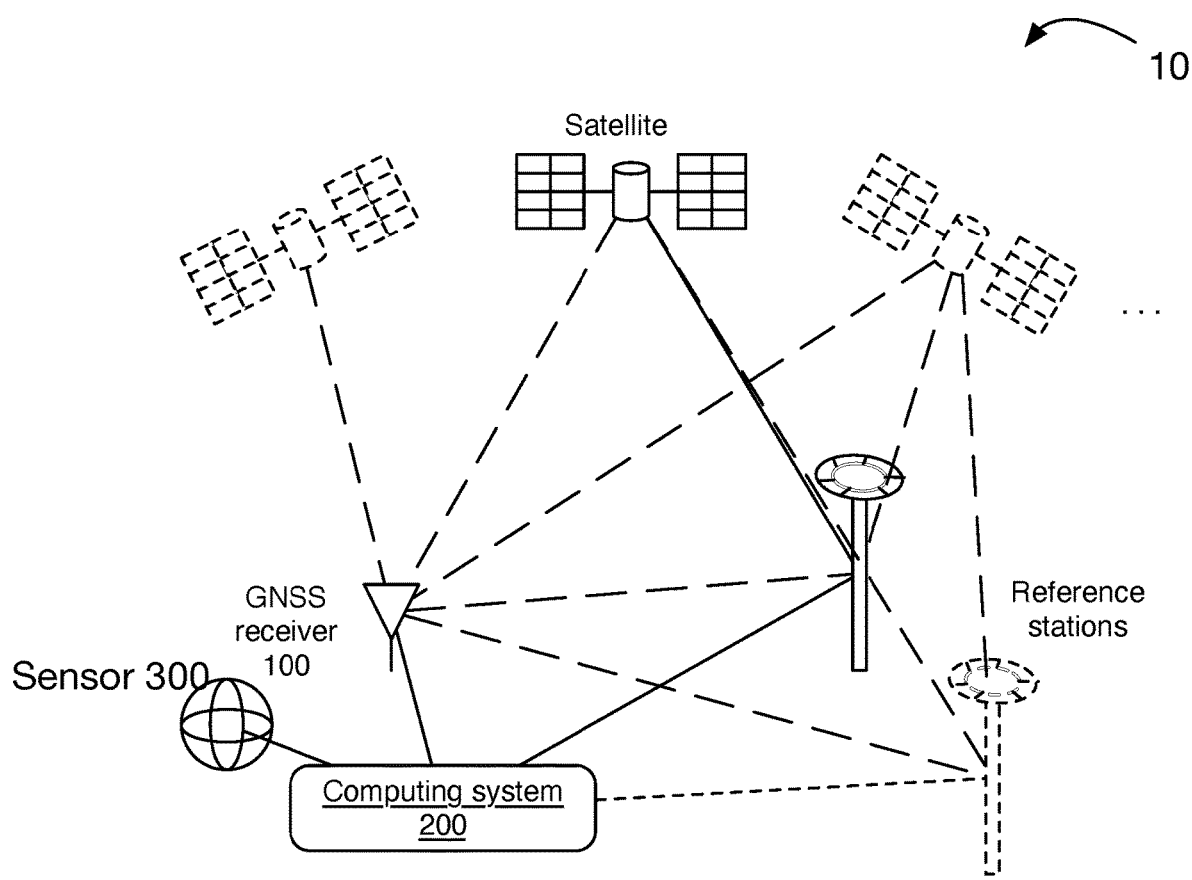
FIG. 1 is a schematic representation of the system.

As shown in FIG. 1, the system 10 can include one or more data sources (e.g., satellites, reference stations, etc.), one or more computing systems 200, one or more GNSS receivers 100, one or more sensors 300, and/or any suitable components.

Figure 2:
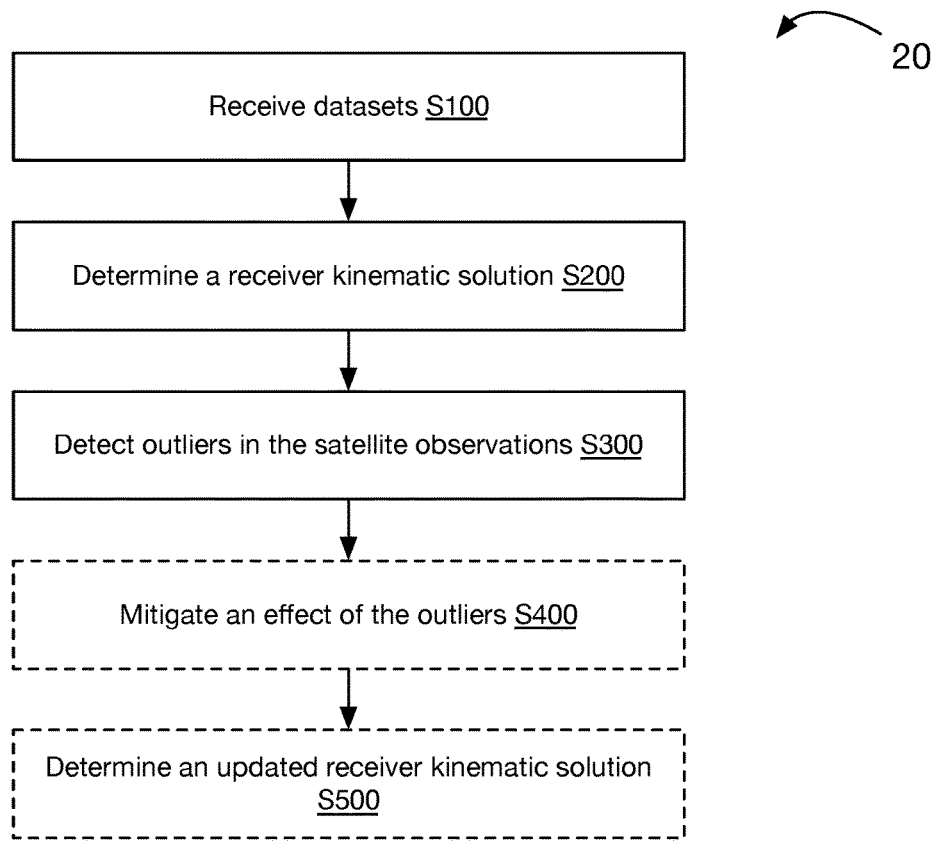
FIG. 2 is a schematic representation of the method.

As shown in FIG. 2, the method 20 can include receiving datasets S100, determining a receiver kinematic solution S200, detecting outliers S300, mitigating an effect of the outliers S400, determining an updated receiver position S500, and/or any suitable steps.

The system and method preferably function to detect (e.g., determine, identify, measure, etc.) outlier(s) in GNSS observations to enable determination of a receiver kinematic solution with a high accuracy (e.g., cm-level, dm-level, m-level, etc.), availability, integrity, and/or other property. However, the GNSS observations can be otherwise used.

Embodiments of the system and/or method can be used, for example, in autonomous or semi-autonomous vehicle guidance (e.g., for unmanned aerial vehicles (UAVs), unmanned aerial systems (UAS), self-driving cars, agricultural equipment, robotics, rail transport/transit systems, autonomous trucking, last mile delivery, etc.), GPS/GNSS research, surveying systems, user devices, mobile applications, internet-of-things (IOT) devices, and/or may be used in any other suitable application. In specific examples, the system (and/or components) can be coupled to any suitable external system such as a vehicle (e.g., UAV, UAS, car, truck, etc.), robot, railcar, user device (e.g., cell phone), and/or any suitable system, and can provide positioning data, integrity data (e.g., protection level data), and/or other data to said system, wherein the system can use the data for control and/or navigation.

2. Benefits.

Variations of the technology can confer several benefits and/or advantages.

First, variants of the technology can enable improved outlier detection in GNSS measurements. In specific examples, the technology can enable improved outlier detection using sensor fusion positioning estimates in a filter without a fully tightly coupled solution (e.g., without a circular feedback loop).

Second variants of the technology can improve and/or assist with carrier phase ambiguity resolution. In a specific example, by using a duplicate filter the outlier detection is less likely to disturb an ambiguity state (e.g., carrier phase ambiguity) as compared to performing the outlier detection within the primary filter. Because the ambiguity state is less likely to be disturbed, better performance (e.g., greater availability, greater accuracy, etc. from anticipated lower quality satellites, from fewer satellites, etc.) can be realized. Additionally, or alternatively, ambiguity fixes that may not have been possible can be achieved.

Third, variants of the technology can enable looser thresholds on a number of satellites and/or fraction of satellite observations observed to be outliers for updating a sensor fusion filter. For instance, rather than using satellite observations associated with at least 4 (and typically at least 5 or 6 to include redundancy) distinct satellites to update a sensor fusion filter, examples of the technology can enable the sensor fusion filter to be updated with <4 distinct satellites (e.g., 1, 2, 3 satellites). In another example, an outlier fraction threshold (e.g., a threshold for what percentage of the satellite signals can be identified as potential, probable, definite, etc. outliers before the positioning engine and/or sensor fusion engine does not perform an update using the satellite signals) can be increased. For instance, an outlier fraction threshold can be 25%, 33%, 40%, 50%, 60%, 75%, 80%, 90%, 95%, and/or any suitable percentage. This technical advantage can be achieved as variants of the technology can be more accurate at detecting outliers and/or inliers.

However, variants of the technology can confer any other suitable benefits and/or advantages.

3. System.

As shown in FIG. 1, the system can include one or more data sources, one or more computing systems, one or more sensors (e.g., IMU sensor, DMI sensor, wheel tick, etc.), and/or one or more GNSS receivers. The system can function to determine kinematic properties of a receiver (e.g., position, velocity, acceleration, jerk, jounce, snap, crackle, pop, higher derivatives of position with respect to time, attitude, elevation, altitude, etc.), detect outliers in GNSS observations, and/or can otherwise function.

The system preferably uses a set of data collected by one or more data sources. Data sources can include: receivers, sensors (e.g., located onboard the receiver, the external system, the reference stations, etc.), databases, satellites, reference stations, and/or any other suitable data source. Examples of data that can be used include: GNSS observations, sensor observations, and/or any other suitable data.

The receiver 100 preferably functions to receive a set of GNSS observations (e.g., satellite signals such as carrier phase and satellite code) from one or more satellites. In variants, the receiver can determine the location of the receiver (and/or external system) based on the GNSS observations. The receiver is preferably in communication with the computing system. However, the receiver can be integrated with the computing system, and/or the receiver and computing system can be arranged in any suitable manner. The receiver is preferably a stand-alone device (e.g., a GNSS receiver, antenna). However, the receiver can be integrated into an external system (e.g., be a component of an automobile, aero vehicle, nautical vehicle, mobile device, etc.), can be a user device (e.g., smart phone, laptop, cell phone, smart watch, etc.), and/or can be configured in any suitable manner.

The set of GNSS observations can include orbital data (e.g., ephemeris), timestamp, range rate data, carrier phase data, pseudorange data, and/or any suitable data. The set of GNSS observations can include and/or be associated with metadata (e.g., ephemeris data) and/or any suitable data or information. The set of GNSS observations preferably includes GNSS observations corresponding to satellites from a plurality of satellite constellations (e.g., Global Positioning System (GPS), GLObal Navigation Satellite System (GLONASS), BeiDou navigation satellite System (BDS), Galileo, Quasi-Zenith Satellite System (QZSS), etc.). However, the set of GNSS observations can correspond to satellites from a single satellite constellation, can include data from an augmentation system (e.g., Satellite Based Augmentation System (SBAS) such as Wide Area Augmentation System (WAAS), European Geostationary Navigation Overlay Service (EGNOS), Multi-Functional Satellite Augmentation System (MSAS), GPS Aided Geo Augmented Navigation (GAGAN), Omnistar, StarFire, etc.; Ground Based Augmentation Systems (GBAS) such as Local Area Augmentation System (LAAS); etc.), and/or can include any suitable data.

In variants of the system including more than one receiver, each receiver can be configured to receive GNSS observations corresponding to a satellite constellation, to a carrier frequency (e.g., the L1, L2, L5, E1, E5a, E5b, E5ab, E6, G1, G2, G3, B1, B2, B2a, B2b, B2ab, B3, LEX, etc. frequencies), and/or corresponding to any suitable source.

The reference station(s) preferably function to receive a set of GNSS observations (e.g., reference station GNSS observations) and transmit the reference station GNSS observations to the computing system (and/or to the receiver). The GNSS observations from the reference station(s) can be used to determine corrections (e.g., local and/or global corrections such as to account for atmospheric effects such as ionosphere delay, troposphere delay, ionosphere gradient, etc.; orbit errors; clock errors; hardware biases; antenna offsets such as phase center offset, phase center variation, etc.; ocean tides; pole tides; solid Earth tides; etc.) to the set of GNSS observations measured (or otherwise received) by the receiver.

The sensor(s) 300 preferably function to measure sensor data associated with the external system and/or the GNSS receiver. The sensor data is preferably used to determine (e.g., independent of the GNSS observations) the external system (or the sensor) kinematic parameters, but can additionally or alternatively be used to assist (e.g., speed-up, correct, refine, etc.) the calculation (e.g., calculating the state vector, estimating the phase ambiguity) of kinematic parameters from the GNSS observations and/or be otherwise used. The sensors are preferably in communication with the computing system, but can be integrated into the computing system, connected to the computing system, be separate from the computing system (e.g., connect to the computing system through an intermediary system), and/or can otherwise be arranged.

The sensor(s) can be: on-board the external system, on-board a separate external system, integrated into the GNSS receiver, separate from the GNSS receiver, and/or otherwise associated with the GNSS receiver.

The sensor data can include: inertial data (e.g., velocity, acceleration, angular velocity, angular acceleration, magnetic field, etc.), odometry, distance, pose (e.g., position, orientation, etc.), mapping data (e.g., images, point clouds), temperature, pressure, ambient light, landmarks (e.g., image key features), images, video feeds, and/or any other suitable data. The sensors can include one or more of: inertial measurement unit (IMU), accelerometer, gyroscope, magnetometer, odometer (e.g., wheel speeds; wheel ticks; steering angles; visual odometers such as cameras; etc.), distance measurement instrument (DMI), image sensor (e.g., camera, stereo camera, depth camera, etc.), pressure sensors, and/or any suitable sensor.

The computing system 200 preferably functions to process the data (e.g., GNSS observations) from the receiver and/or the reference stations. The computing system can: aggregate the data (e.g., combine the receiver GNSS observations, reference station GNSS observations, and sensor data; reorganize the receiver GNSS observations, reference station GNSS observations, and sensor data such as based on the time stamp, time of transmission, time of receipt; etc.), filter the data (e.g., to calculate state vectors, ambiguities such as phase ambiguities, etc. associated with the data), calculate the receiver position (e.g., based on ambiguities), correct the data (e.g., correct the GNSS observations for orbit errors, clock errors, hardware biases, antenna offsets, atmospheric effects, ocean tides, pole tides, etc.), detect outliers (e.g., cycle slips, etc.), and/or can process the data in any suitable manner. The computing system can be local (e.g., on-board the external system, integrated in a receiver, integrated with a reference station, etc.), remote (e.g., cloud computing, server, networked, etc.), and/or distributed (e.g., between a remote and local computing system).

The computing system is preferably communicably coupled to the receiver, to the reference station, but the computing system can be in communication with any suitable components. In variants, the computing system can include one or more: communication module, filter, outlier detection module, and/or any suitable modules.

Figure 4:
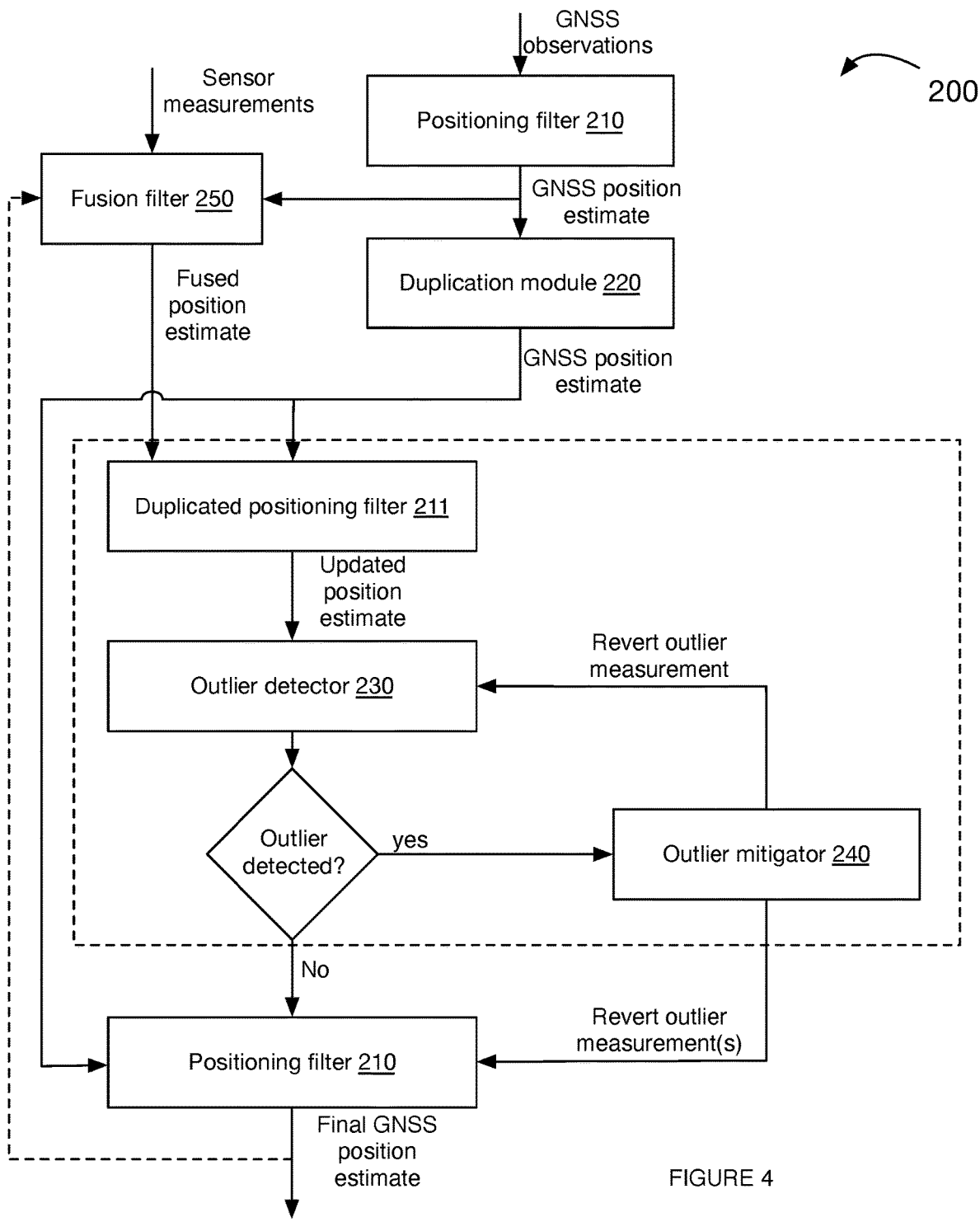
FIG. 4 is a schematic representation of an example of detecting outliers using a duplicated filter.

As shown for example in FIG. 4, the computing system can include a positioning engine (e.g., including a filter such as a Kalman filter, extended Kalman filter, unscented Kalman filter, etc. configured to estimate a rover or receiver positioning solution based on the satellite observations), a fusion engine (e.g., a sensor fusion engine that can include a filter such as a Kalman filter, extended Kalman filter, unscented Kalman filter, etc. configured to estimate a rover or receiver fused positioning solution and/or sensor errors such as sensor bias using sensor measurements and a positioning solution from the positioning engine, using processed satellite observations such as disclosed in U.S. patent application Ser. No. 18/115,963 titled 'SYSTEM AND METHOD FOR FUSING SENSOR AND SATELLITE MEASUREMENTS FOR POSITIONING DETERMINATION' filed 1 Mar. 2023 which is incorporated in its entirety by this reference, etc.), a duplication module (e.g., configured to duplicate a filter of the positioning engine and/or fusion engine which can provide a technical advantage of decreasing a risk of data contamination and/or inability to fully roll back a filter update resulting from outlier detection), an outlier detector (e.g., configured to detect one or more outliers in the set of satellite observations, satellite signals, sensor data, sensor readings, sensor measurements, etc.), an outlier mitigator (e.g., configured to mitigate an impact of one or more outliers on the positioning solution and/or fused positioning solution), and/or any suitable modules and/or components. In some examples, the duplication module, the outlier detector, the outlier mitigator, and/or any suitable components can be integrated in the positioning engine and/or the fusion engine. However, the modules and/or engines can otherwise be integrated and/or isolated from one another. In a specific example, the computing system can include any suitable components as disclosed in U.S. patent application Ser. No. 18/073,304 titled "SYSTEM AND METHOD FOR FUSING SENSOR AND SATELLITE MEASUREMENTS FOR POSITIONING DETERMINATION" filed 1 Dec. 2022 which is incorporated in its entirety by this reference.

4. Method.

As shown in FIG. 2, the method 20 can include receiving dataset(s) S100, determining a receiver kinematic solution S200, detecting outliers S300, mitigating an effect of the outliers S400, determining an updated receiver position S500, and/or any suitable steps.

The method preferably functions to determine (e.g., detect, measure, identify, analyze, etc.) outliers in a set of GNSS observations, where the GNSS observations (e.g., inliers of the GNSS observations) can be used to estimate (e.g., calculate, determine) a receiver position (e.g., as part of a positioning engine, fusion engine, etc.). Steps and/or substeps of the method can be performed iteratively (e.g., for different epochs, for the same epoch, etc.), sequentially (e.g., for different external systems), and/or in any suitable order. The steps and/or substeps of the method can be performed in series and/or in parallel. The steps and/or substeps are preferably performed by a system as described above, but can be performed by any system.

Receiving datasets S10 functions to measure, acquire, receive, access, etc. one or more sets of data that can be used to determine a receiver positioning solution. Exemplary datasets can include: GNSS observations (e.g., from a shared epoch; from one or more epochs such as sequential epochs, epochs spaced by a predetermined amount of time, etc.; etc.), sensor data (e.g., sensor readings, sensor measurements, etc.), external system data (e.g., steering wheel, map data, etc.), and/or any suitable data. Receiving the datasets can include transmitting the datasets to a computing system and/or to a receiver (e.g., from a database), monitoring the datasets (e.g., for a predetermined event, for faults, etc.), and/or any suitable steps. The datasets can be stored (e.g., temporarily stored such as in short-term memory, cache, etc.). When more than one dataset is received (e.g., GNSS observations and sensor data), the datasets are preferably received (e.g., acquired) contemporaneously (e.g., concurrently, simultaneously, etc.), but can be received in any order.

Receiving datasets can include receiving the GNSS observations S100 functions to measure and/or detect a set of satellite signals, where each satellite signal is associated with a satellite, at a reference station, a receiver, and/or at any suitable endpoint. The satellite signals can include satellite code, satellite pseudorange, carrier phase, and/or any suitable data. The GNSS observations are preferably received (e.g., acquired) at a GNSS acquisition frequency. The GNSS observations are preferably associated with a timestamp. The timestamp is preferably the time the GNSS observations were acquired but can be the time of receipt (e.g., by the computing system), the time of processing, and/or be any suitable time.

Receiving datasets can include receiving sensor data, which functions to receive data from one or more sensors. The sensor data is preferably received by a computing system, but can be received by any suitable component. The sensor data can be received from a sensor, a computing system (e.g., database, etc.), and/or from any suitable system. The sensor data is preferably received (e.g., acquired) at a sensor acquisition frequency. The sensor acquisition frequency can be less than, the same as, and/or greater than the GNSS observation frequency. The sensor data is preferably associated with a timestamp. The timestamp is preferably the time the data was acquired but can be the time of receipt (e.g., by the computing system), the time of processing, and/or be any suitable time. In a first illustrative example, receiving sensor data can include receiving acceleration and/or rotation data from an accelerometer and/or gyroscope. In a second illustrative example, receiving sensor data can include acquiring one or more images, where the images can be processed (e.g., using artificial intelligence, manually, using image processing algorithms, using stereo-image algorithms, monocular vision algorithms, etc.). In a third illustrative example, receiving sensor data can include measuring or receiving wheel tick (or other odometry or distance measuring instrument) and/or steering angle data. In a fourth illustrative example, any or all of the preceding three examples can be combined. However, any suitable sensor data can be received.

In some variants, receiving the sensor data can include processing the sensor data. For example, the sensor data can be (pre)processed to remove, account for, mitigate, and/or otherwise correct for sensor error terms (e.g., sensor bias, sensor thermal bias, scale factors, nonlinearities, nonorthogonalities, misalignments, g-sensitivity, $g^2$-sensitivity, cross-axis sensitivity, etc.). However, the sensor data can be processed within a filter (e.g., an error estimator of a fusion engine, in S200, etc.) and/or can otherwise be processed.

Receiving the datasets can include synchronizing the datasets, which can function to align datasets to a common time basis. For example, sensor data can be synchronized to (e.g., time aligned) to the GNSS observations, GNSS observations can be synchronized to the sensor data, GNSS observations and sensor data can be aligned to an external reference, a common reference can be used, and/or the datasets can otherwise be synchronized.

Figure 3:
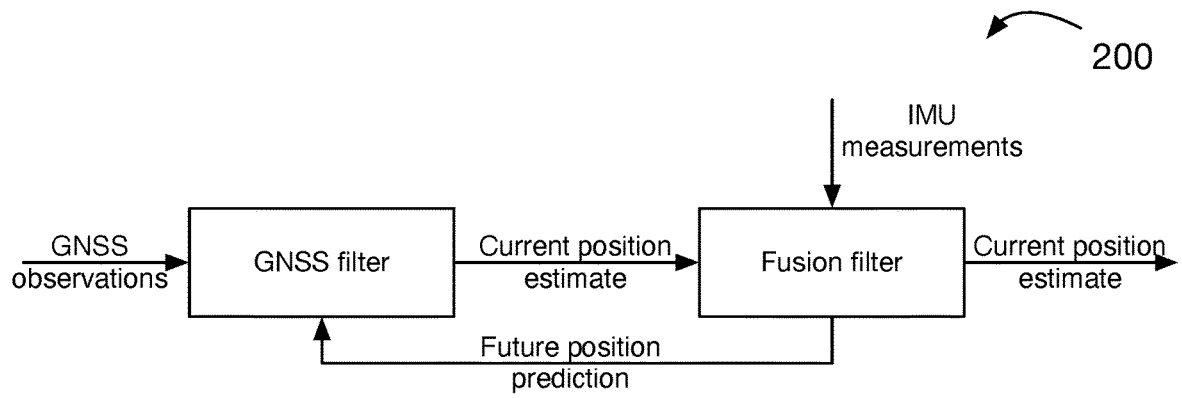
FIG. 3 is a schematic representation of an example of data flow between a GNSS filter and a fusion filter.

Determining the receiver positioning solution S200 functions to determine the GNSS receiver and/or rover position to high accuracy (e.g., receiver position is known to within 1 mm, 2 mm, 5 mm, 1 cm, 2 cm, 5 cm, 1 dm, 2 dm, 5 dm, 1 m, 2 m, 5 m, 10 m, values or ranges therebetween, etc.). The receiver positioning solution is preferably determined by the receiver (e.g., a computing system thereof, a positioning engine, a fusion engine, etc.), but can be determined by the computing system and/or any component. The receiver position solution can be determined using sensor data (e.g., using a fusion engine), GNSS observations (e.g., using a positioning engine), and/or any suitable data can be used (e.g., landmarks). The sensor data and the GNSS observations are preferably loosely coupled (e.g., a fusion filter ingests a position estimate determined based on the GNSS observations rather than the GNSS observations directly, as shown for example in FIG. 3, etc.), but can be tightly coupled (e.g., a fusion filter can ingest raw GNSS observations and raw sensor data), semi-tightly coupled (e.g., a fusion filter can ingest processed GNSS observations and raw or processed sensor data), and/or otherwise be coupled when both data types are used to determine the receiver positioning solution.

The receiver positioning solution can be determined using an estimator and/or any suitable method and/or algorithm. Exemplary estimators include: Kalman filters (e.g., unscented Kalman filters, extended Kalman filters, recursive Kalman filters, etc.), particle filters (e.g., monte carlo simulators), least squares solution calculators (e.g., running an iterative snapshot least squares method), a Gaussian process, and/or any suitable estimator can be used.

Determining positioning solution using GNSS observations functions to determine the GNSS positioning solution of the external system, sensor, and/or GNSS receiver based on the GNSS observations. Determining the GNSS positioning solution is preferably performed as GNSS observations are received, but can be performed as the sensor data is received and/or with any suitable timing. The GNSS positioning solution can be determined in a manner analogous to the determination of position, velocity, acceleration, higher order derivatives of position with respect to time (e.g., jerk, jounce, snap, crackle, pop, etc.), attitude, and/or other suitable positioning solution terms as disclosed in U.S. patent application Ser. No. 16/685,927 filed 15 Nov. 2019 entitled "SYSTEM AND METHOD FOR SATELLITE POSITIONING," U.S. patent application Ser. No. 16/817,196 filed 12 Mar. 2020 entitled "SYSTEMS AND METHODS FOR REAL TIME KINEMATIC SATELLITE POSITIONING," and/or U.S. patent application Ser. No. 17/022,924 filed 16 Sep. 2020 entitled "SYSTEMS AND METHODS FOR HIGH-INTEGRITY SATELLITE POSITIONING," each of which is incorporated in its entirety by this reference. However, the GNSS positioning solution can be determined from the GNSS observations in any manner. When GNSS observations associated with a plurality of GNSS receivers (e.g., antennas) are measured, determining the GNSS positioning solution can be performed independently for GNSS observations from different GNSS receivers and/or determining the GNSS positioning solution can be performed in a manner that merges the GNSS observations for different GNSS receivers.

Determining the receiver positioning solution using GNSS observations can include: determining a carrier phase ambiguity (e.g., a float carrier phase ambiguity, an integer carrier phase ambiguity, etc.), calculating the receiver positioning solution based on the carrier phase ambiguity, determining a baseline vector between a receiver and a reference station, determining an absolute receiver positioning solution (e.g., by applying the baseline vector to the reference station location), determining a relative receiver positioning solution (e.g., relative to a prior time point, epoch, etc.), and/or any steps. Determining the receiver positioning solution using GNSS observations can use a GNSS estimator (e.g., an estimator that can ingest GNSS observations), a fusion estimator (e.g., an estimator that can ingest GNSS observations, sensor data, etc.), and/or any suitable estimator.

Determining a positioning solution using sensor data functions to determine the positioning solution of the external system, sensor, and/or GNSS receiver based on the sensor data. Determining a sensor positioning solution (e.g., fused positioning solution) is preferably performed as sensor data is received, but can be performed at a delayed time (e.g., as GNSS observations are received), and/or with any suitable timing. The fused positioning solution is preferably determined using a fusion estimator (e.g., Kalman filter, extended Kalman filter, unscented Kalman filter, Gaussian process, etc. that ingests sensor readings, GNSS positioning solution, processed satellite observations, raw satellite observations, corrections information, reference station observations, etc. to determine the fused positioning solution, sensor error(s), positioning solution covariances, etc.). Determining a fused positioning solution preferably includes determining the positioning solution using a mechanization model and integrating the mechanized data. The mechanization model and/or integrator can account for earth rotation, Coriolis forces, gravity, and/or any other real or fictitious forces to calculate or update the fused positioning solution from a previously computed positioning solution. However, the positioning solution can be otherwise determined from the sensor data. When sensor data associated with a plurality of sensors is measured, determining a positioning solution can be performed independently for sensor data from different sensors, sensor data for different sensors can be merged and/or determined in a unified manner (e.g., accounting for, leveraging, etc. a lever arm effect between sensors), and/or the kinematic parameters can otherwise be determined. The mechanization model preferably uses (e.g., leverages) small angle approximations, which can provide a technical advantage of simplifying the mechanization model (e.g., which can decrease a computational burden of the mechanization model). However, the mechanization model and/or integrator can otherwise function.

In some variants, the datasets can be measured at different measurement frequencies. In these variants, S200 can include separate lagging and real-time processes. For example, a GNSS positioning solution (and/or sensor error such as sensor bias) can be determined in a lagging process and a sensor fused position (e.g., position update using incoming sensor measurements) can be determined in a real-time process (with potential updates as new GNSS positioning solutions and/or sensor errors become available). However, S200 can be performed with any suitable timing.

S200 can include converting the positioning solution from a GNSS receiver and/or sensor reference frame to a body (e.g., rover) reference frame (e.g., based on a pose, transformation, etc. between the data source and the body reference frame).

In a specific example, the positioning solution (e.g., receiver positioning solution, rover positioning solution, GNSS positioning solution, fused positioning solution, kinematic solution, etc.) can be determined in a manner as disclosed in U.S. patent application Ser. No. 18/073,304 titled "SYSTEM AND METHOD FOR FUSING SENSOR AND SATELLITE MEASUREMENTS FOR POSITIONING DETERMINATION" filed 1 Dec. 2022 which is incorporated in its entirety by this reference (e.g., can include determining a motion state and modifying a filter based on the motion state, can include validating a positioning solution, fuse a GNSS positioning solution and sensor or fused positioning solution, etc.). However, the positioning solution can be determined in any manner.

Detecting outliers in the GNSS observations S300 functions to identify one or more GNSS observations as outliers. S300 is preferably performed by a receiver (e.g., a computing system of a receiver, an outlier detector, etc.), but can be performed by a computing system (e.g., a remote computing system), and/or by any suitable component. The outliers can be detected by an estimator (e.g., of a positioning engine, of a fusion engine, etc.), by an outlier detector, and/or by any suitable module.

Outliers can be detected sequentially, in parallel, and/or in any suitable order and/or timing. For example, a first outlier can be identified, the outlier can be mitigated (e.g., according to S400), and an estimator (e.g., a GNSS estimator, of a positioning engine, of a fusion engine, etc.) can produce an updated receiver positioning solution, where the updated receiver positioning solution can be used to check for a second (and so on) outlier. This process can be repeated (e.g., for a second, third, fourth, fifth, etc. outlier) until no outlier is detected. However, all outliers can be detected at the same time, and/or the outliers can be detected in any order and/or with any timing.

The outliers are preferably detected based on the receiver positioning solution (e.g., in state space, in a solution space, fused positioning solution compared to individual satellite positioning solution, etc.). However, additionally or alternatively, the outliers can be detected in an observation space (e.g., directly in the GNSS observations such as by converting the fused positioning solution to a predicted GNSS observation for each satellite in view of the receiver), based on a receiver positioning displacement (e.g., which can be beneficial in some situations as carrier phase ambiguities do not necessarily need to be determined when a receiver displacement is used but can leverage or use differences in carrier phase between different epochs such as consecutive epochs, nonconsecutive epochs such as separated in time by an amount of time depending on an application, an amount of), and/or in any suitable manner.

Figure 5:
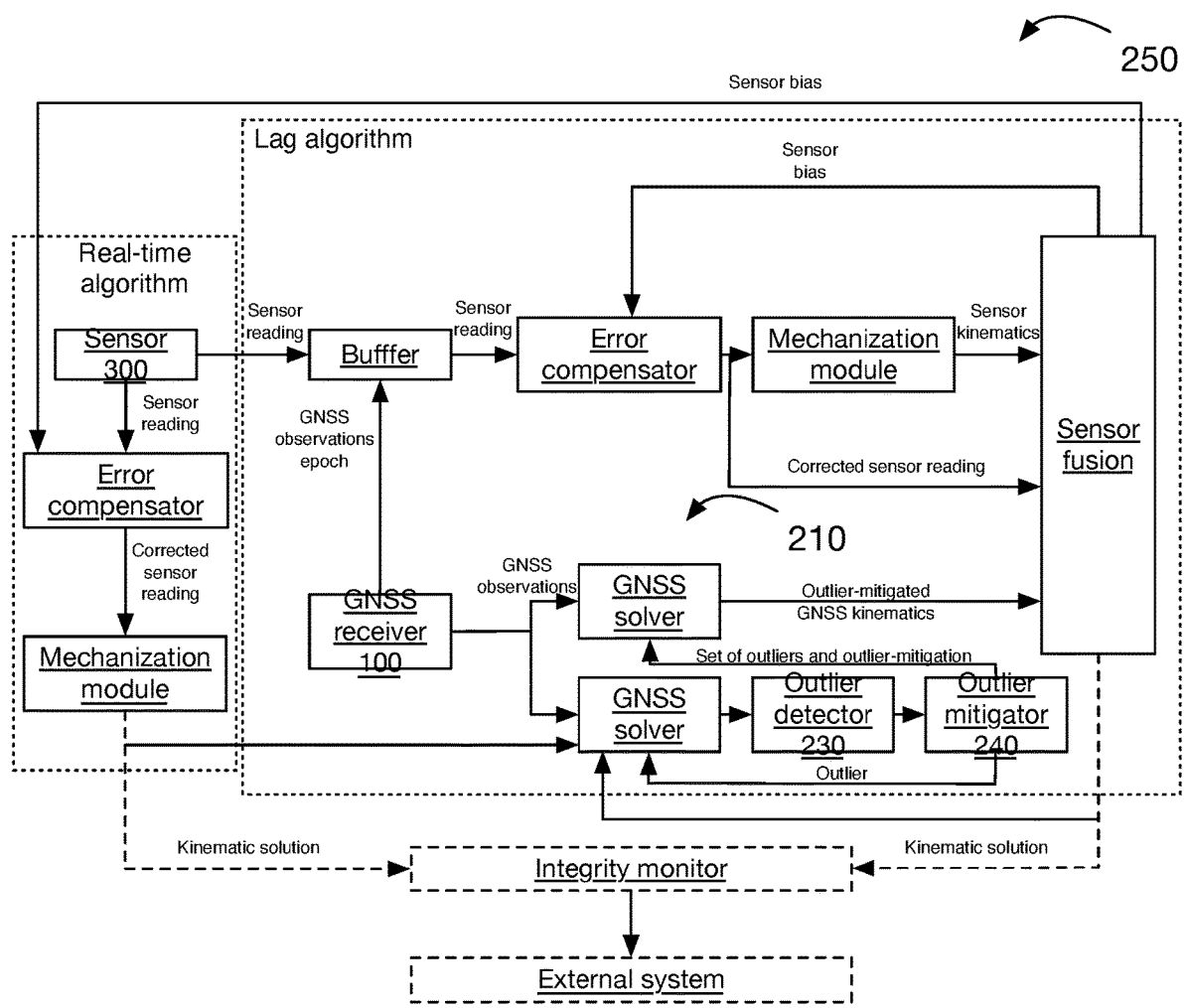
FIG. 5 is a schematic representation of an example of a fusion engine.
Figure 6A:
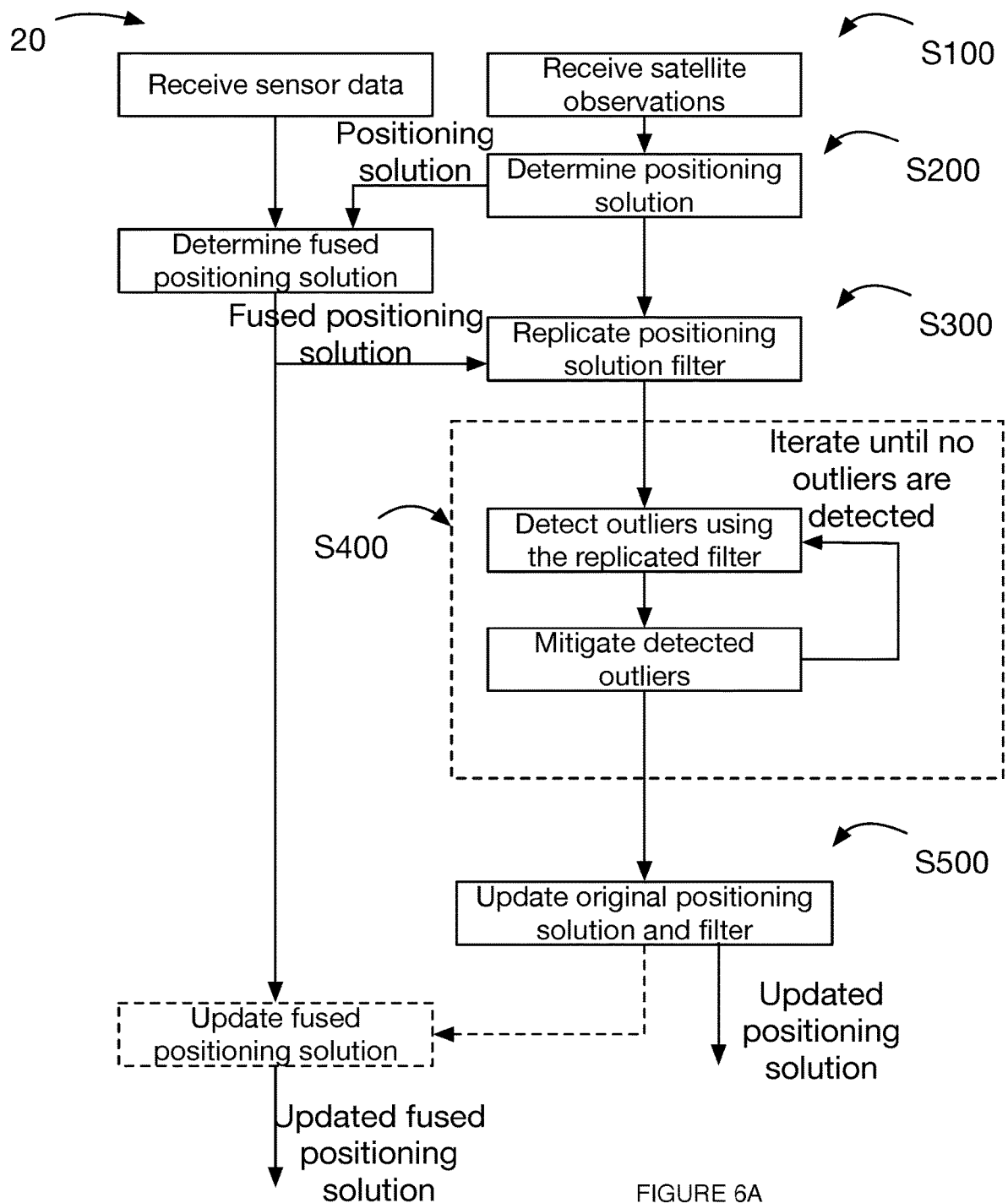
FIGS. 6A and 6B are schematic representations of examples of variants of the method.
Figure 6B:
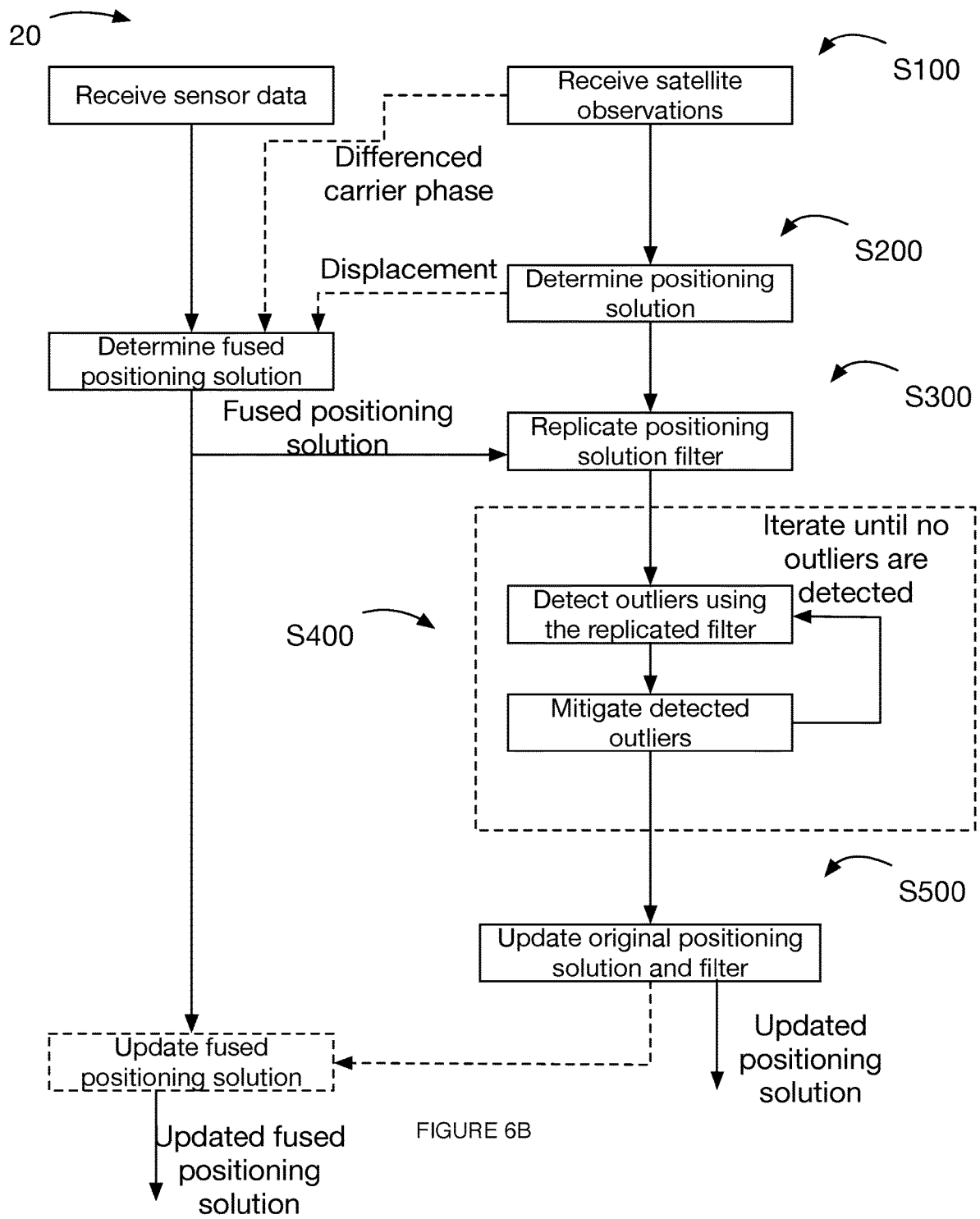

The outliers are preferably determined using (e.g., within, using a positioning solution calculated with, etc.) a second GNSS estimator (e.g., where the first, primary, etc. GNSS estimator is used to produce a GNSS receiver positioning solution that is transmitted to a fusion filter, used by an external system, etc.) and/or outlier detector associated therewith (as shown for example in FIG. 5). The use of the second GNSS estimator (e.g., a duplicate of the first or primary GNSS estimator) can provide a technical advantage of reducing data contamination from reversing an estimator update as outlier(s) are detected. However, the outliers can be determined using the GNSS estimator (e.g., the primary GNSS estimator), a fusion estimator (e.g., a primary fusion estimator, a secondary fusion estimator, etc.), an independent outlier detector, and/or any suitable component. The second GNSS estimator can be a duplicate of the GNSS estimator, an independent GNSS estimator (e.g., operating with the same inputs, models, noise, etc.; configured to generate the same output given the same input as a primary GNSS estimator; etc.), and/or can be any suitable estimator. In an illustrative example, detecting an outlier can include duplicating (and/or replicating) a GNSS estimator (e.g., as used in S200). The GNSS estimator is preferably duplicated after the original estimator has completed an update (e.g., after S200 is complete such that the duplicate copy has the updated states). However, the GNSS estimator can additionally or alternatively be duplicated before and/or during the original estimator update.

The second GNSS estimator preferably receives (in addition to the inputs to the GNSS estimator or primary GNSS estimator as in S200) a fused positioning solution as determined using a fusion filter (e.g., a current receiver positioning solution, a predicted receiver positioning solution, etc.). However, the second GNSS estimator can additionally or alternatively receive sensor data, sensor error(s), and/or any suitable information or data. The fused positioning solution (e.g., fusion receiver positioning solution, fusion receiver position solution, etc.) is preferably used to constrain the second GNSS receiver positioning solution (e.g., the position, average velocity, instantaneous velocity, acceleration, higher order derivatives of position with respect to time, attitude, etc.). For instance, the fusion receiver positioning solution can be used by the second GNSS estimator to test whether a state (e.g., a positioning solution estimated from a single satellite, single satellite constellation, etc.), GNSS observation, positioning solution, and/or other information is (e.g., includes, is associated with, etc.) an outlier. However, the fused positioning solution can additionally or alternatively be used by the second GNSS estimator to determine the GNSS positioning solution and/or can otherwise be used. The fused positioning solution can be provided at the GNSS antenna (e.g., the fusion estimator can be augmented with the GNSS antenna position), at an external vehicle reference (e.g., where the second GNSS estimator can receive a vehicle reference position offset relative to the GNSS antenna), and/or the fusion receiver positioning solution can be provided relative to any suitable reference.

The second GNSS estimator (and optionally the first GNSS estimator) can treat phase ambiguity as a continuous variable, can attempt to constrain the phase ambiguity to an integer. For example, detecting one or more outliers can include (e.g., after calculating a second position estimate) calculating phase measurement residuals and comparing those residuals to integer multiples of full phase cycles (e.g., $2\pi n$). If the residual is close (e.g., differs from an integer value by at most a threshold), this may be indicative of a cycle slip, rather than an erroneous observation.

In some variants, detecting an outlier can include identifying an outlier as a cycle slip. For example, when a phase measurement residual is close to (e.g., within a threshold value of) an integer multiple of a half or full phase cycle, an outlier can be identified as a cycle slip. In some variations, the use of displacements (e.g., as opposed to, in addition to, etc. absolute position) can provide a technical advantage for facilitating cycle slip detection. In another example, identifying outlier(s) as cycle slips can include verifying that the value of the cycle slip can be chosen reliably (e.g., by verifying that only a single integer cycle slip value is contained within a known window of variance around the value of the residual), and testing the cycle slip value against the residual (e.g., by verifying that the cycle slip value is within a window of variance of the residual value; where two windows of variance described here may be distinct). However, an outlier can be identified as a cycle slip in any manner.

In a first specific example, a GNSS estimator can detect GNSS outliers by: generating a set of posterior observation residual covariances from the set of posterior observation residual values; calculating a set of posterior observation residual variances from the set of posterior observation residual covariances; scaling the set of posterior observation residual values using the set of posterior observation residual variances; and identifying at least one GNSS observation as a statistical outlier based on a corresponding scaled posterior observation residual value being outside a threshold range.

In a variation of the first specific example (sometimes referred to as a scaled residual technique), detecting one or more outliers can include calculating posterior residual values for the satellite data observations. That is, for observations $z_k$ and posterior state estimate $\hat{x}_{k|k}$ (e.g., calculated in S200, fused positioning solution, GNSS positioning solution, etc.), detecting one or more outliers can include calculating the residual $$\tilde{v}_{k|k} = z_k - H_k \hat{x}_{k|k}$$

where $H_k$ is an observation model that maps the true state space into the observed space and where $\tilde{v}_{k|k}$ is sometimes additionally or alternatively referred to as the measurement post-fit residual or posterior observation residual. From the posterior observation residual, detecting one or more outliers can include determining (e.g., calculating, estimating, etc.) the posterior observation residual covariance, $$C_k = R_k - H_k P_{k|k} H_k^T$$

where $R_k$ is the covariance of $n_k$ and $P_{k|k}$ is the updated state covariance.

In this variation, the variance of the posterior observation residual vector can be determined (e.g., estimated, calculated, etc.) from the posterior observation residual covariance:

$$\sigma^2 = \frac{v^T R_k^{-1} v}{DOF}$$

where DOF is degrees of freedom and where v can alternatively be written as Sz where S is an matrix having a trace equivalent to the DOF. From this, it can be said that $$S = I - H_k P_{k|k} H_k^T R_k^{-1}.$$

This variance can be used to scale the residuals $\tilde{v}_{k|k}$ (e.g., by dividing residuals by their associated standard deviations or by their associated variances). The scaled residuals are then compared to a threshold window (e.g., one corresponding to plus or minus 3 standard deviations from the mean), and any observations falling outside the threshold window can be flagged as (probable such as with greater than a threshold probability of being) outlier observations. The threshold is preferably on the order of about 10 cm (e.g., 5-20 cm). Smaller thresholds can be more selective (e.g., more accurate positioning solution), but provide less availability and the opposite can be true for larger thresholds (e.g., less accurate positioning solution but greater availability). However any suitable threshold(s) can be used (e.g., less than 10 cm, greater than 10 cm, depending on accuracy needs of an application, depending on availability needs of an application, etc.).

In a second specific example, a GNSS estimator can detect GNSS outliers by: generating a set of posterior observation residual covariances from the set of posterior observation residual values; calculating a set of posterior observation residual variances from the set of posterior observation residual covariances; identifying a presence of statistical outliers in the set of satellite positioning observations based on a first number of the set of posterior observation residual variances being outside a threshold range; generating a first reduced set of satellite positioning observations by removing a first subset of the set of satellite positioning observations; recalculating the set of posterior observation residual variances using the first reduced set of satellite positioning observations; determining that a number of the set of recalculated posterior observation residuals outside the threshold range is lower than the first number; and in response to this determination, identifying a subset of the GNSS observations as statistical outliers.

In a variation of the second specific example (sometimes referred to as a variance threshold technique), the posterior residual, posterior residual covariance, and posterior residual variance can be calculated as in the first specific example (and/or variations thereof). This variation can be particularly (but not exclusively) useful for differenced measurements (and as such can be implemented with or benefit from using displacements in addition to or alternative to positioning solutions) as differenced measurements can be correlated, and thus more likely to result in an outlier in one observation corrupting residuals that correspond to different observations.

In this variation, the posterior residual variances can be examined (e.g., compared to a threshold) directly. If one or more posterior residual variances is outside of a threshold range (e.g., one corresponding to plus or minus 1, 2, 3, 5, etc. standard deviations from the mean), this can be an indication that one or more outliers may be present in the observation data. The threshold is preferably on the order of about 10 cm (e.g., 5-20 cm). However any suitable threshold(s) can be used (e.g., less than 10 cm, greater than 10 cm, depending on accuracy needs of an application, depending on availability needs of an application, etc.).

In this variation of the second example, detecting one or more outliers can include removing a set of observations and recalculating the posterior residual variances. When the posterior residual variances fall below threshold levels, the algorithm can stop here. However, additionally or alternatively, the algorithm can try removing a different set of observations (and so on, until at least one or more of them falls below threshold levels, to find the highest quality posterior residual variances, etc.). Alternatively stated, the algorithm can continue until the number of posterior residual variances outside of a threshold range is less than a threshold number.

Alternatively, in this variation, detecting one or more outliers can include calculating posterior residual variances for a number of set-reduced observations (i.e., different subsets of the whole set of observations) and choosing the reduced set with the lowest variance.

In a third specific example, a GNSS estimator can detect GNSS outliers using a combination of the first and second specific example of detecting GNSS outliers. In a variation of the third specific example, detecting outliers in a manner similar to the second specific example of outlier detection when a number of posterior residual variances outside of a threshold range is greater than (or equal to) a threshold number and detecting outliers in a manner similar to the first specific example when the number of posterior residual variances outside of a threshold range is less than or equal to the threshold number. In a second variation of the third specific example, detecting outliers can be performed in a manner similar to the first specific example of outlier detection when a number of posterior residual variances outside of a threshold range is greater than (or equal to) a threshold number and detecting outliers can be performed in a manner similar to the second specific example when the number of posterior residual variances outside of a threshold range is less than or equal to the threshold number.

In a variation of the third specific example (sometimes referred to as a hybrid technique), the posterior residual, posterior residual covariance, and posterior residual variance can be determined (e.g., estimated, calculated, etc.) as in the scaled residual technique. The posterior residual variances can be examined. When one or more posterior residual variances is above a threshold (e.g., the same or a different threshold than the one mentioned in the variance threshold technique), outlier(s) can be detected using a variance threshold technique. When one or more posterior residual variances is less than or equal to the threshold, the outlier(s) can be this variation can select between the variance threshold and scaled residual techniques in any manner (e.g., based on the number of above-threshold or below-threshold posterior residual variances, a magnitude of the posterior residual variances, a posterior residual covariance threshold, a posterior residual magnitude, etc.). The threshold is preferably on the order of about 10 cm (e.g., 5-20 cm). However any suitable threshold(s) can be used (e.g., less than 10 cm, greater than 10 cm, depending on accuracy needs of an application, depending on availability needs of an application, etc.).

In a fourth specific example, outliers can be detected using a scaled residual technique, a variance threshold technique, a hybrid technique, and/or any suitable technique or combination of techniques such as those disclosed in U.S. patent application Ser. No. 16/748,517 titled 'SYSTEMS AND METHODS FOR REDUCED-OUTLIER SATELLITE POSITIONING' filed 21 Jan. 2020 incorporated in its entirety by this reference.

However, outliers can be detected based on a measurement innovation and/or can otherwise be detected.

Mitigating an effect of the outlier(s) S400 functions to reduce or remove an impact of outliers (e.g., detected outliers) on an updated receiver positioning solution (e.g., as calculated in S500, future estimated receiver positioning solutions, etc.). S400 can be performed by an outlier mitigator, a computing system, a receiver, and/or by any suitable component. All outliers (e.g., outliers detected in S300) can be mitigated, a subset of outliers can be mitigated (e.g., a most egregious outlier can be mitigated and then satellite observations can be reevaluated for whether they are outliers, outliers beyond a mitigation threshold can be mitigated, etc.), and/or any suitable outliers can be mitigated. Outlier(s) are preferably detected in the GNSS observations, but can additionally or alternatively be detected in the sensor data and/or in any suitable dataset(s).

Mitigating the effect of outliers can include: removing one or more GNSS observations from the set of GNSS observations, applying a weight factor to one or more GNSS observations (e.g., apply a smaller weight factor to outliers, apply a larger weight factor to inliers, etc.), acquiring additional GNSS observations, repairing (e.g., correcting) a cycle slip (e.g., when S300 identifies, verifies, etc. outlier(s) as probable cycle slip(s)), adding new observations (e.g., synthetic satellite observations) with negative variances as updates to the positioning solution estimate (the new observations serving to remove the effects of detected outlier observations), and/or any suitable mitigation steps.

Mitigating the effect of outliers can be performed once, a predetermined number of times, until a criterion is met, iteratively with S300 (e.g., detecting whether any outliers are present in the dataset and mitigating the outliers before repeating an outlier detection to see if the mitigation removes the outliers), and/or with any suitable frequency, period, and/or repetition rate. S400 and S300 are preferably performed iteratively until all outliers have been mitigated (e.g., removed from the dataset, weighted such that the previously identified outliers are no longer detected as outliers, as shown for example in FIG. 4, etc.). However, S300 and S400 can be performed iteratively until: the dataset includes GNSS observations from at most a threshold number of satellites (e.g., GNSS observations only associated with 1, 2, 3, 4, 5, 10, etc. unique satellites), a threshold fraction of satellite observations are outliers, the dataset includes GNSS observations from at most a threshold number of satellite constellations, a subset of outliers have been mitigated (e.g., outliers with a greatest difference relative from inliers, outliers with a large impact on the receiver positioning solution, outliers with a large covariance, etc.), for a target number of iterations, until a threshold residual is achieved, until a change in a positioning solution changes by at most a threshold amount, and/or until any suitable iteration criteria is achieved.

The GNSS estimator (e.g., outlier detector associated therewith, outlier mitigator associated therewith, memory, cache, etc.) used to detect the outliers (e.g., the secondary GNSS estimator, duplicate GNSS estimator, etc.) preferably retains (e.g., stores) the GNSS observations that are identified as outliers along with any mitigation process(es) applied thereto. However, the GNSS estimator can additionally or alternatively transmit the outliers (and/or mitigation effects) to the primary GNSS estimator (e.g., as outliers are detected) and/or fusion estimator, and/or can otherwise provide information regarding outliers to other endpoints. After outliers are detected (e.g., iterations are complete), the outliers (and/or associated mitigation processes) can be transmitted to the primary GNSS estimator. However, additionally or alternatively, one or more states of the second GNSS estimator can be transmitted (e.g., to avoid updating the primary GNSS estimator, for instance a second GNSS receiver positioning solution can be transmitted), and/or any suitable data or information can be transmitted to the GNSS estimator, fusion estimator, and/or other suitable endpoint(s).

Determining the updated receiver positioning solution S500 functions to determine the GNSS receiver position using outlier mitigated data. S500 can be performed in the same and/or a different manner from S200. The updated receiver positioning solution can have a higher availability, greater accuracy, better integrity, and/or otherwise be related to the receiver positioning solution (e.g., from S200). As an illustrative example, a filter (e.g., a positioning engine filter, GNSS estimator, fusion engine, etc.) can be updated to remove or update states associated with satellite observations that were identified as outliers. S500 is preferably performed when at most a threshold fraction (e.g., percentage) of the total satellite observations are identified as outliers (e.g., probable outliers). In a specific example, the threshold percentage can be about 50% (i.e., when 50% or fewer of the total satellite observations are identified as outliers, S500 can be performed). However, the threshold percentage can additionally or alternatively be 10%, 20%, 25%, 30%, 33%, 40%, 60%, 70%, 75%, 80%, 90%, 95%, and/or any suitable value or range therebetween. However, S500 can be performed when any fraction of the satellite observations has been identified as outliers. Another technical advantage conferred by S300 and/or S400 on the performance of S500 in some variants is that the set out outlier mitigated satellite observations can include satellite observations associated with fewer than 4 satellites (e.g., because the data quality of those satellite observations can be assured with sufficient accuracy). The use of satellite observations associated with fewer than 4 satellites can be beneficial for improving an availability of a satellite positioning solution in a noisy environment (e.g., in a dense urban environment). However, satellite observations associated with greater than 4 satellites can be used.

In variants, the receiver positioning solution (e.g., the original receiver positioning solution, the updated receiver positioning solution, an intermediate receiver positioning solution, etc.) can be transmitted to an external system, stored (e.g., cached), used to operate and/or control an external system, used to generate operation instructions for an external system (e.g., using a GNSS receiver computing system, an external system computing system, etc.), and/or used in any manner.

The methods of the preferred embodiment and variations thereof can be embodied and/or implemented at least in part as a machine configured to receive a computer-readable medium storing computer-readable instructions. The instructions are preferably executed by computer-executable components integrated with a system for GNSS PVT generation. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A system comprising:
    a GNSS receiver, mounted to a body, configured to measure satellite observations associated with one or more satellite constellations;
    a sensor, collocated with the GNSS receiver, configured to measure sensor measurements; and
    a computing system configured to:
        determine a positioning solution of the body by processing the satellite observations with a positioning filter;
        determine a fused positioning solution of the body using the sensor measurements and the positioning solution;
        generate a duplicate positioning filter configured to receive the positioning solution and the fused positioning solution; and
        detect outliers in the satellite observations using the duplicated positioning filter;
    wherein when outliers are detected, the computing system updates the positioning solution based on the detected outliers.

2. The system of claim 1, wherein the outlier detector is configured to detect the outliers based on a set of posterior observations residuals.

3. The system of claim 2, wherein the computing system is configured to detect the outliers by:
    determining a set of posterior observation residual variances;
    scaling the set of posterior observation residuals using the set of posterior observation residual variances; and
    identifying at least one satellite observation as an outlier based on a corresponding scaled posterior observation residual being outside a threshold range.

4. The system of claim 3, wherein the computing system is further configured to detect the outliers by, when a number of residual variances of the posterior residual variances outside a threshold variance range is at least a threshold number:
    determining a reduced set of satellite observations by removing a subset of the satellite observations;
    recalculating the set of posterior observation residual variances using the reduced set of satellite observations;
    determining that a number of residuals of the set of recalculated posterior observation residuals outside the threshold range is lower than the first number; and
    determining a set of the GNSS observations as statistical outliers based on the reduced set of satellite observations.

5. The system of claim 1, wherein the filter comprises a Kalman filter.

6. The system of claim 1, wherein the satellite observations comprise a carrier phase measurement, wherein the outlier detector is configured to identify an outlier as a cycle slip when a phase measurement residual differs from an integer value by at most a threshold amount.

7. The system of claim 1, wherein the positioning solution comprises a receiver position displacement from a previous epoch, wherein the outlier detector receives a fused displacement estimate from the fusion engine.

8. The system of claim 1, wherein the computing system is further configured to temporally align the positioning solution and the fused positioning solution.

9. The system of claim 8, wherein when the computing system receives two or more epochs of satellite observations without corresponding sensor measurements, the computing system is configured to detect outliers without using the fused positioning solution.

10. The system of claim 1, wherein when the outlier detects that greater than 50% of the satellite observations are outliers, the computing system is configured to not determine the positioning solution of the body.

11. A method for detecting outliers in satellite observations comprising:
    at a GNSS receiver connected to a body, measuring satellite observations associated with one or more satellite constellations;
    at an inertial measurement unit (IMU) connected to the body, measuring IMU data;
    determining a GNSS positioning solution using a filter to process the satellite observations;
    determining a fused positioning solution using a fusion filter to process the GNSS positioning solution and the IMU data;
    duplicating the filter to generate a duplicate filter;
    transmitting the fused positioning solution to the duplicate filter;
    detecting whether outliers are present in the satellite observations using the duplicate filter; and
    when outliers are detected, updating the GNSS positioning solution using a set of outlier mitigated satellite observations.

12. The method of claim 11, detecting whether outliers are present comprises detect whether outliers are present based on a set of posterior observations residuals.

13. The method of claim 12, wherein detecting whether outliers are present comprises:
    determining a set of posterior observation residual variances;
    scaling the set of posterior observation residuals using the set of posterior observation residual variances; and
    identifying at least one satellite observation as an outlier based on a corresponding scaled posterior observation residual being outside a threshold range.

14. The method of claim 13, wherein detecting whether outliers are present comprises, when a number of residual variances of the posterior residual variances outside a threshold variance range is at least a threshold number:
- determining a reduced set of satellite observations by removing a subset of the satellite observations;
- recalculating the set of posterior observation residual variances using the reduced set of satellite observations;
- determining that a number of residuals of the set of recalculated posterior observation residuals outside the threshold range is lower than the first number; and
- determining a set of the GNSS observations as statistical outliers based on the reduced set of satellite observations.

15. The method of claim 11, wherein the filter comprises a Kalman filter.

16. The method of claim 11, wherein the satellite observations comprise a carrier phase measurement, wherein detecting whether outliers are present comprises identifying an outlier as a cycle slip when a phase measurement residual differs from an integer value by at most a threshold amount.

17. The method of claim 11, further comprising temporally aligning the positioning solution and the fused positioning solution.

18. The method of claim 11, wherein when greater than 50% of the satellite observations are determined to be outliers, the positioning solution is not updated.

* * * * *